June 9, 1925.
D. B. SMITH
TRANSMISSION RELINING BAND
Filed May 21, 1924
1,541,406
2 Sheets-Sheet 2

INVENTOR
DOUGLAS B. SMITH
BY
ATTYS.

Patented June 9, 1925.

1,541,406

UNITED STATES PATENT OFFICE.

DOUGLAS B. SMITH, OF SAN FRANCISCO, CALIFORNIA.

TRANSMISSION RELINING BAND.

Application filed May 21, 1924. Serial No. 714,896.

*To all whom it may concern:*

Be it known that I, DOUGLAS B. SMITH, a citizen of the United States, residing at the city and county of San Francisco and State of California, have invented new and useful Improvements in Transmission Relining Bands, of which the following is a specification.

This invention relates to automobile transmissions of the planetary type and particular pertains to liners for the transmission and brake bands thereof.

The liner disclosed in the present application is of the flexible type capable of being inserted into and removed from the transmission without entirely disassembling the latter.

It is the principal object of the present invention to provide liners of the type referred to with means adapted to expedite the operation of replacing liners in transmissions.

In carrying out this object I provide a flexible liner having its ends formed with complementary parts of a detachable connection so that the end of a new liner may be detachably connected to the end of a liner in place in the transmission. By such connection the act of removing the old liner will serve to properly insert the new liner into place. This is advantageous inasmuch as it is otherwise difficult to insert a new liner owing to the compactness of the transmission parts.

One form which the invention may assume is exemplified in the following description and illustrated by way of example in the accompanying drawings, in which.

Referring more particularly to the accompanying drawings, 10 indicates a transmission case of a Ford type automobile. The top of the case 10 is formed with an opening 11 which is provided with a removable cover plate. The case 10 incloses a planetary transmission having the usual drums 12 and operating bands 14. The liner of these bands must be frequently replaced to insure proper operation of the transmission.

Figure 3:
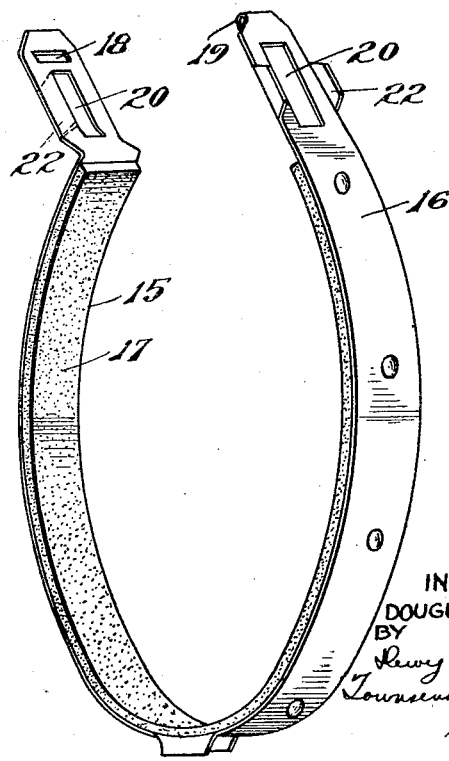
Fig. 3 is a perspective view of the liner.

For this purpose I provide a liner 15 which is clearly illustrated in Fig. 3. This liner is of the type capable of being positioned in the transmission without entirely disassembling the latter; it being only necessary to remove the transmission case cover and to disconnect the operating shafts from the transmission bands.

This liner comprises a flexible band 16 preferably of steel and a treated fabric lining 17 which is riveted or otherwise secured to the interior surface of the band.

To expedite the insertion of a new liner when it is desired to replace the liner of the transmission band I form one of the ends of my improved liner with an eyelet 18. The other end of the liner is formed with a hook 19. When positioning a new liner into place the hook 19 is detachably engaged with the eyelet 18 in the band it is desired to replace. A pull is then exerted on the other end of the latter to withdraw it from the transmission.

Figure 1:
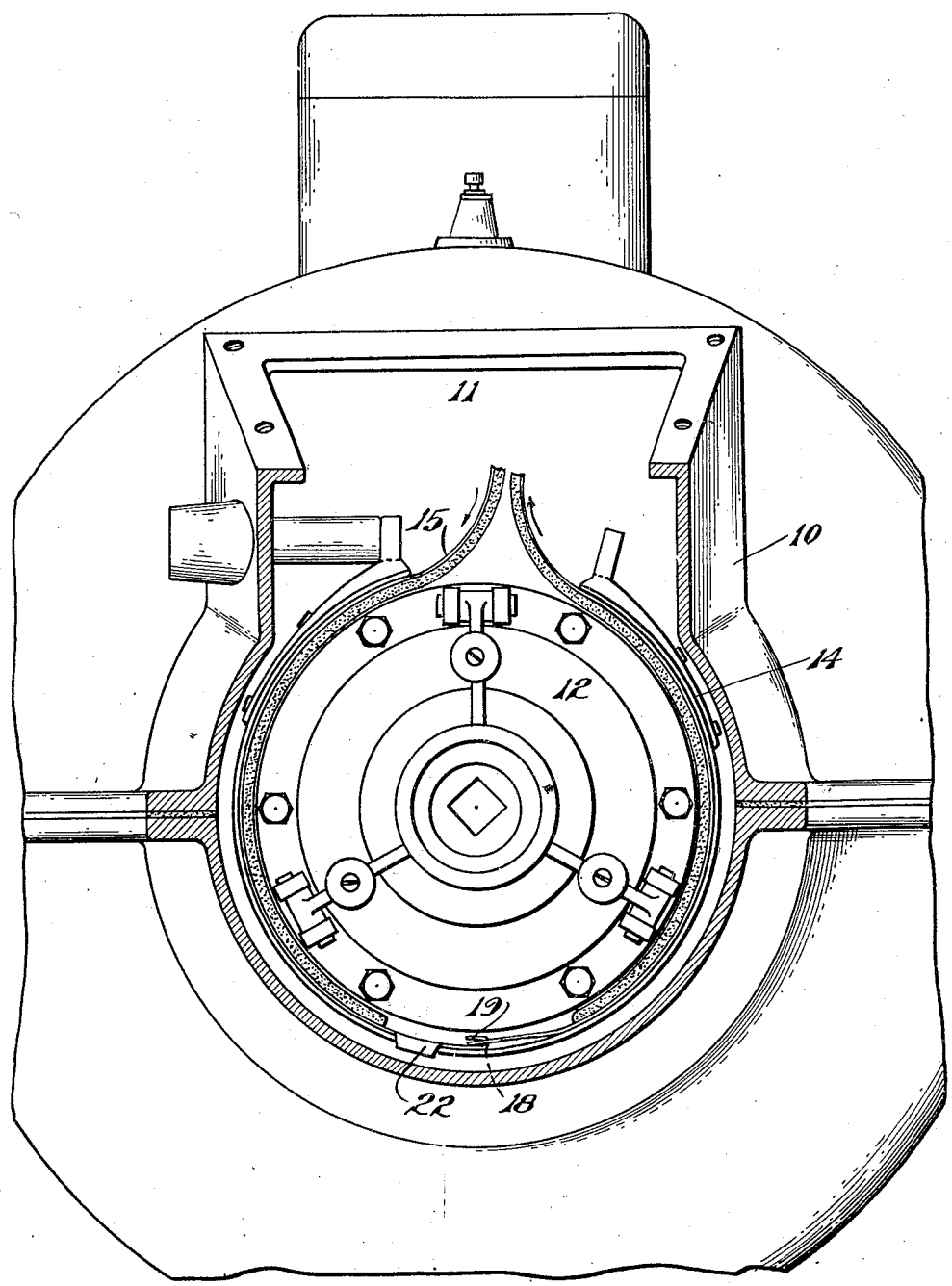
Fig. 1 is a transverse section through a planetary type transmission showing a band reliner embodying the present invention being inserted therein.
Figure 2:
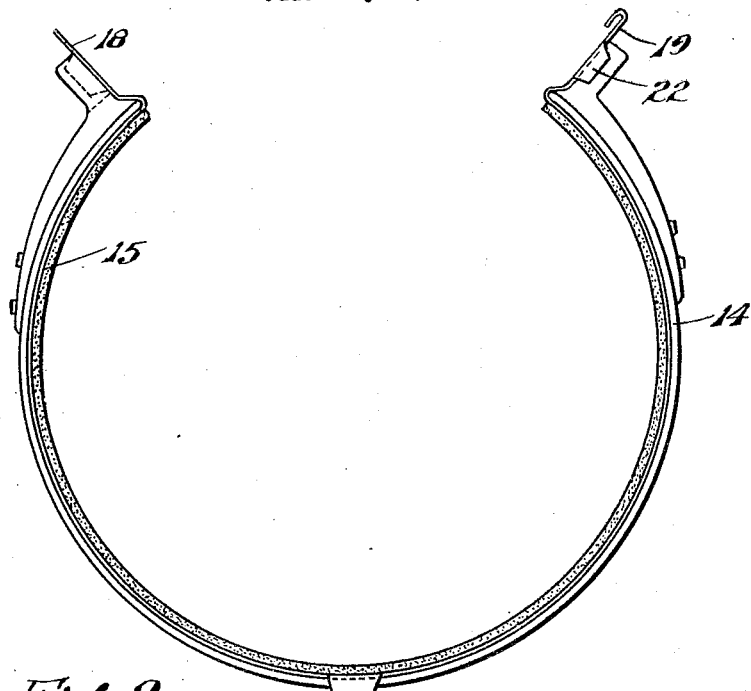
Fig. 2 is a side elevation of the transmission band with my improved liner mounted thereon.

It is obvious from Fig. 1 that the act of withdrawing the old liner from the transmission will be the means for positioning the new liner into place.

When the old liner has been fully withdrawn it may be disconnected from the new liner, which will then be in proper position on the transmission band. When the liner has been correctly positioned the ends thereof are bent into intimate contact with the end lugs on the transmission band.

Referring to Fig. 3 it will be seen that the ends of the liner are provided with slotted openings 20 which are adapted to align with the openings in the end lugs of the transmission band. To prevent relative movement between the ends of the liner and the transmission band I form the ends of the liner with lugs 22 which are adapted to engage the sides of the end lugs on the transmission band. By preventing relative movement between the liner and the transmission band chattering of the former is prevented and damaging of the operating shafts of the band is obviated.

It is obvious from the foregoing that by my invention the operation of inserting new liners into transmission bands has been expedited.

While I have shown the preferred form of my invention as now known to me, it will be understood that various changes may be made in the combination, construction and arrangement of parts, without departing from the invention as set forth in the appended claims.

Having thus described my invention what I claim and desire to secure by Letters Patent is:

1. A liner for transmission bands comprising a flexible band having a friction facing, the ends of said band being adapted to be bent against the lugs of a transmission band, the opposite ends of said band being slotted and formed with the component parts of a hook and eye connection.

2. As an article of manufacture a liner for transmission bands comprising a flexible steel band having a friction facing, one end of said band being formed with an eyelet and the other end of said band being hooked in a form whereby it may be engaged with an eyelet similar to that formed in the other end of the band.

DOUGLAS B. SMITH.